Nov. 17, 1925.  1,562,378
H. J. STEAD
METHOD OF MANUFACTURING BIFOCAL LENSES
Filed Feb. 21, 1922
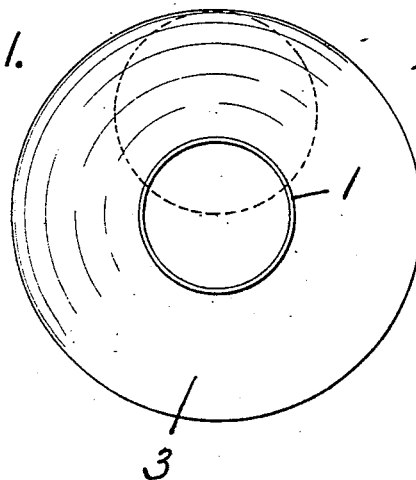
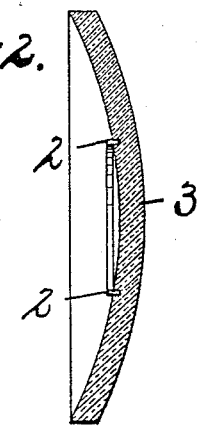
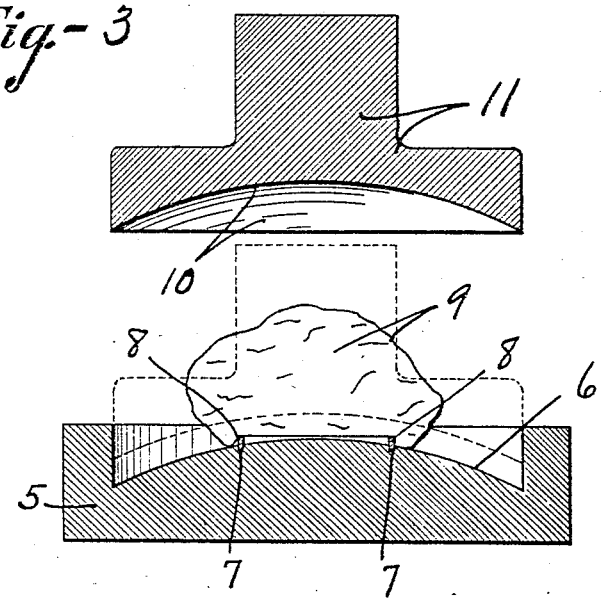

Patented Nov. 17, 1925.

1,562,378

UNITED STATES PATENT OFFICE.

HAROLD J. STEAD, OF GENEVA, NEW YORK.

METHOD OF MANUFACTURING BIFOCAL LENSES.

Application filed February 21, 1922. Serial No. 538,174.

*To all whom it may concern:*

Be it known that I, HAROLD J. STEAD, a citizen of the United States, and a resident of Geneva, in the county of Ontario, in the State of New York, have invented new and useful Improvements in Methods of Manufacturing Bifocal Lenses, of which the following, taken in connection with the accompanying drawings, is a full, clear, and exact description.

This invention relates to certain improvements in method of manufacturing bifocal lenses.

The object of my invention is to produce an improved method of manufacturing the lens described and claimed in my co-pending application Serial No. 508,570, filed October 8, 1921.

In the drawings:—

Figure 1 illustrates a lens blank having an annular groove formed therein.

Figure 2 is a section through the blank of Figure 1 showing the groove filled and the blank in condition for the usual grinding process.

Figure 3 illustrates a modified and perhaps perferred method of producing the annular zone of filling material which is to space the two fields of vision of the completed lens.

As illustrated in Figures 1 and 2 I may start with an ordinary piece of glass hereinafter called a blank, and which may be, as shown, concavo-convex to more readily conform itself to the manufacture of a desired form of lens.

In this blank of glass and preferably as shown, upon the concave side thereof, is ground a circular or annular recess, —1— of required depth, so as not to be entirely ground away by the grinding process carried out in the manufacture of the two optical fields of vision as hereinafter described. Within this groove so formed in the blank is placed a suitable filling material. This filling material may be of glass or other crystalline substance, transparent or translucent, and may be made in the form of rings or circles and placed and secured in the groove by subjecting the same to a temperature which will cause the materials to unite by fusion and the piece of glass —2— to become a substantially integral portion of the blank —3— and from the blank so formed, which comprises the piece of glass with the groove and the filling material, whether integrally secured therein, or otherwise, the completed bifocal lens may be ground in the usual manner.

This filling material may, however, be painted in the groove, or flowed in in liquid or semi-liquid form, and then baked therein to cause it to adhere. Many and various methods of placing and securing the filling material within the groove —1— will be apparent in the light of this disclosure.

When the groove, formed as described, by grinding or otherwise, has been filled, the blank so formed may then be ground in the usual manner, so that the annular filling material constitutes a zone between the two completed fields of visions. The dotted lines in Figure 1 indicate a method of cutting the completed lens from the blank used in the process, after the grinding has been completed.

In the preferred method disclosed in Figure 3, the mold section —5— is used which section may have a molding surface —6— of a desired curvature, as for instance, the desired curvature of either of the bifocal surfaces to be produced, or may be merely a surface for molding a blank of substantially the form shown in Figure 1. This molding surface —6— is formed with an annular or ring shaped groove —7— for the reception of the ring shaped filling material —8— which, may be of glass and when placed therein, is supported by the walls of the groove in position for forming the groove in a piece of molten glass —9— which may be placed upon the mold section —5— and pressed into proper form by engagement with the mold surfaces —6— and —10— by means of any suitable pressing device, as plunger —11— having its lower surface constituting said mold surface —10—. The filling material —8— forms the groove in the molten glass and at the same time fills the same and becomes a portion of the blank so that any subsequent grinding desired or necessary for perfecting the bifocal surfaces can be carried on in such a manner that the filling material constitutes a zone separating the two visual surfaces when completed. The mold surface —6— and the filling material —8— should in the preferred process be slightly heated to such a degree as not to materially effect the character of the molten glass —9— when brought into contact therewith.

After the blank has been produced in accordance with the method of Figure 3, or a groove has been formed in a rough piece of glass as disclosed in Figures 1 and 2, and a filling material has been inserted or secured therein, or formed therein, as disclosed in Figure 3, the curvatures desired for near vision and distance vision can be formed upon the blank in the usual manner and in such relation that the filling material forms a zone separating the two surfaces.

As before stated, this filling material may be any suitable desired material, as glass or other crystalline substance, and may be transparent, translucent or colored, and it may be in many cases preferable to form this separating zone of a slightly tinted material so as to clearly distinguish it from the visual surfaces disposed upon opposite sides thereof.

Altho I have shown and described a particular method of producing a bifocal lens of my invention, I do not desire to limit myself to the same, as various changes may be made in the details of the process without departing from the invention, as set forth in the appended claims.

It will further be obvious that my invention is not limited to the formation of a single groove, but that several grooves in zones of filling material may be produced in the blank, if desired.

I claim:—

1. In the process of manufacturing multifocal lenses, molding a groove in a piece of glass, utilizing the groove forming portion of said mold as a filler for said groove, and then grinding the glass to form an optical surface thereon.

2. In the process of manufacturing multifocal lens blanks, molding a groove in a piece of glass, securing a ring of different material in said groove, and grinding visual surfaces upon opposite sides of said ring.

3. In the process of manufacturing multifocal lenses the steps of forming a groove in a piece of glass, filling said groove and then grinding optical surfaces of different dioptrics upon opposite sides of said filling.

In witness whereof I have hereunto set my hand this 14th day of February 1922.

HAROLD J. STEAD.